(12) United States Patent
Walsh

(10) Patent No.: US 6,381,897 B1
(45) Date of Patent: May 7, 2002

(54) FISHING ROD HOLDER

(75) Inventor: Ronald E. Walsh, Lansdowne, PA (US)

(73) Assignee: Unique-Co, Inc., Lansdowne, PA (US)

( * ) Notice: Subject to any disclaimer, the term of this patent is extended or adjusted under 35 U.S.C. 154(b) by 0 days.

(21) Appl. No.: 09/496,552

(22) Filed: Feb. 2, 2000

Related U.S. Application Data
(60) Provisional application No. 60/157,867, filed on Oct. 6, 1999.

(51) Int. Cl.$^7$ ............................................... A01K 97/10
(52) U.S. Cl. ......................................................... 43/21.2
(58) Field of Search ........................... 43/21.2; 211/70.8; 248/528, 529

(56) References Cited

U.S. PATENT DOCUMENTS

| | | | | | |
|---|---|---|---|---|---|
| 3,190,594 | A | * | 6/1965 | Chiou | 248/529 |
| 3,747,881 | A | * | 7/1973 | Akamu | 248/514 |
| 4,642,931 | A | * | 2/1987 | Flores | 43/21.2 |
| 4,993,346 | A | * | 2/1991 | Rupp | 114/255 |
| 5,070,638 | A | * | 12/1991 | Tregaskis | 43/15 |
| 5,301,451 | A | * | 4/1994 | VanAssche | 43/27.4 |
| 5,546,693 | A | * | 8/1996 | Stockton et al. | 43/21.2 |
| 5,673,507 | A | * | 10/1997 | Stokes, Jr. | 43/21.2 |
| 5,738,035 | A | * | 4/1998 | Rupp, II | 114/255 |
| 5,778,817 | A | * | 7/1998 | Rupp | 114/255 |
| 5,813,164 | A | * | 9/1998 | Liberto | 43/21.2 |
| 5,855,088 | A | * | 1/1999 | Lee | 43/21.2 |
| 6,052,937 | A | * | 4/2000 | Morong | 43/21.2 |
| 6,053,122 | A | * | 4/2000 | Jordan, III | 114/255 |
| 6,089,524 | A | * | 7/2000 | Lai | 248/535 |

* cited by examiner

Primary Examiner—Kurt Rowan
(74) Attorney, Agent, or Firm—Armand M. Vozzo, Jr.

(57) ABSTRACT

An improved fishing rod holder is disclosed for a hard top or other overhead structure of a boat comprising an assembly of interconnected tubular members movable relative to each other so that the rod holder may be rotated between a stationary upright position wherein a fishing rod is held firmly and a downward position wherein a rod may be easily removed from or inserted into the holder. The tubular members of the holder include a base member adapted to be mounted to the boat structure by a weldment attached thereto, a rod tube pivotally connected to the base member and sized to hold the butt end of a fishing rod, and a latch handle sized to fit around the rod tube and further formed to releasably engage the base member coaxially thereby placing the holder in the stationary upright position. When a fishing rod is required to be removed from the holder or another rod inserted therein, the latch handle is grasped and pushed upward by the fisherman along the rod tube disengaging the latch handle from the mounted base so that the rod tube may be rotated downward toward the fisherman for easy rod removal or insertion. To return the fishing rod holder to its stationary upright position, the latch handle is regrasped by the fisherman and rotated upward together with the rod tube, both pivoting relative to the base member, until the latch handle re-engages the base member coaxially and secures the holder in place.

12 Claims, 4 Drawing Sheets

US 6,381,897 B1

FISHING ROD HOLDER

CROSS-REFERENCE TO RELATED APPLICATION

This application is a continuation-in-part of Provisional Application Ser. No. 60/157,867, filed Oct. 6, 1999 for Fishing Rod Holder.

BACKGROUND OF THE INVENTION

The present invention relates to fishing rod holders of the type generally intended to be mounted upon a fishing boat, and more particularly to an improved fishing rod holder having an assembled combination of tubular members pivotally coupled together and releasably latched so that the holder may be easily positioned for insertion and removal of a fishing rod by the fisherman even when mounted overhead.

Recreational fishing boats are often equipped with hard tops, radar arches and other overhead structures that permit the elevated mounting of fishing rod holders known throughout the boating industry as "rocket launchers". Proper design dictates that these rocket launchers are mounted at high enough levels so that the averaged sized person can safely pass under them while standing or walking in an erect position. As a result of the height of these elevated mountings, it is very difficult for the fisherman to load and unload such rocket launchers with a fishing rod without climbing up to the level of the mounting, which, while the boat is at sea, can become a serious safety hazard. Although the fisherman may be able to stretch and reach the elevated height of the mounting while stretching, no present fishing rod holder has been heretofore devised which can be manipulated in a relatively smooth and easy fashion with one hand, if necessary, for full operation of the holder and the proper loading and unloading of the fishing rod relative thereto.

SUMMARY OF THE INVENTION

Accordingly, it is a general purpose and object of the present invention to provide an improved fishing rod holder of the so-called rocket launcher style that is safer and easier to use and operate on a fishing boat then those fishing rod holders heretofore developed.

Another object of the present invention is to provide an improved fishing rod holder for overhead mounting in a fishing boat that can be safely and easily manipulated by a fisherman even when out at sea.

Still another object of the present invention is to provide a rocket launcher style of fishing rod holder that can be fully deployed and operated by a fisherman with one hand, if necessary, without climbing from the deck of the fishing boat.

A further object of the present invention is to provide a fishing rod holder that can be easily mounted upon the hard top or other overhead structures of the fishing boat, that is reasonably inexpensive to manufacture, and reliable in its operation.

Briefly, these and other objects of the present invention are accomplished by an improved fishing rod holder for a hard top or other overhead structure of a boat comprising an assembly of interconnected tubular members movable relative to each other so that the rod holder may be rotated between a stationary upright position wherein a fishing rod is held firmly and a downward position wherein a rod may be easily removed from or inserted into the holder. The tubular members of the holder include a base member adapted to be mounted to the boat structure by a weldment attached thereto, a rod tube pivotally connected to the base member and sized to hold the butt end of a fishing rod, and a latch handle sized to fit around the rod tube and further formed to releasably engage the base member coaxially thereby placing the holder in the stationary upright position. When a fishing rod is required to be removed from the holder or another rod inserted therein, the latch handle is grasped and pushed upward by the fisherman along the rod tube disengaging the latch handle from the mounted base so that the rod tube may be rotated downward toward the fisherman for easy rod removal or insertion. To return the fishing rod holder to its stationary upright position, the latch handle is regrasped by the fisherman and rotated upward together with the rod tube, both pivoting relative to the base member, until the latch handle re-engages the base member coaxially and secures the holder in place.

For a better understanding of these and other aspects of the present invention, reference should be made to the following detailed description taken in conjunction with the accompanying drawings in which like reference numerals and characters designate like parts throughout the figures thereof.

BRIEF DESCRIPTION OF THE DRAWINGS

For a fuller understanding of the nature and objects of the present invention, references in the detailed description set forth below shall be made to the accompanying drawings in which.

DETAILED DESCRIPTION OF THE INVENTION

Figure 1:
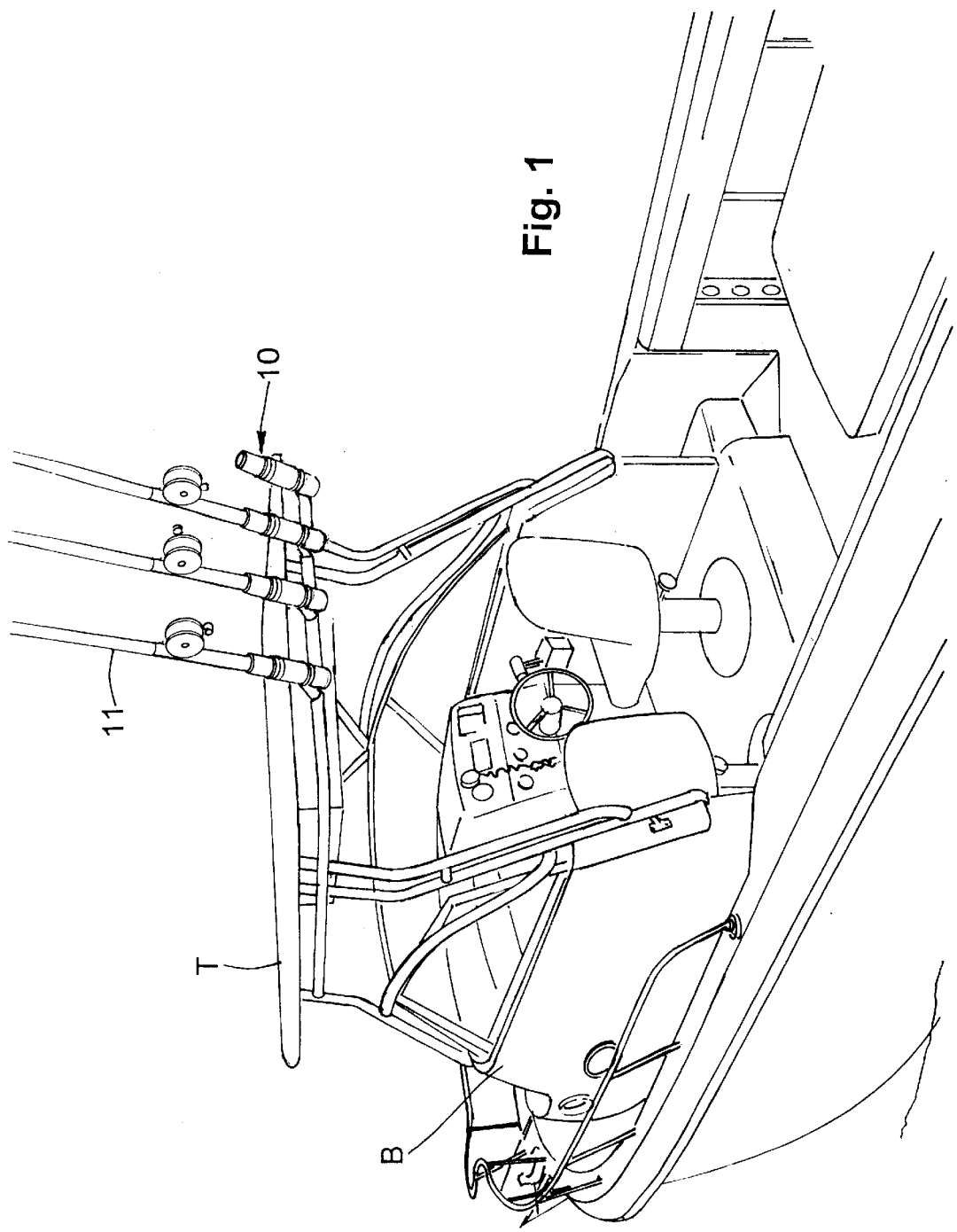
FIG. 1 is a perspective view of a recreational boat equipped with a series of fishing rod holders each constructed in accordance with the present invention and mounted in stationary upright positions upon overhead structure of the boat.

Referring now to the drawings and particularly at first to FIG. 1, a recreational fishing boat B is shown having a canopy or hard top T set above the main deck of the boat at an elevation sufficiently above the normal standing height of a passenger. At the rear edge of the hard top T, the fishing rod holder of the present invention, generally designated 10, is mounted typically in a group or series sometimes called "rocket launchers" as shown along the rear edge of the hard top. Each fishing rod holder 10 is designed to work independently of the other and hold a respective fishing rod 11 in a stationary upright position directed slightly aft of the hard top T of the boat B.

Figure 2:
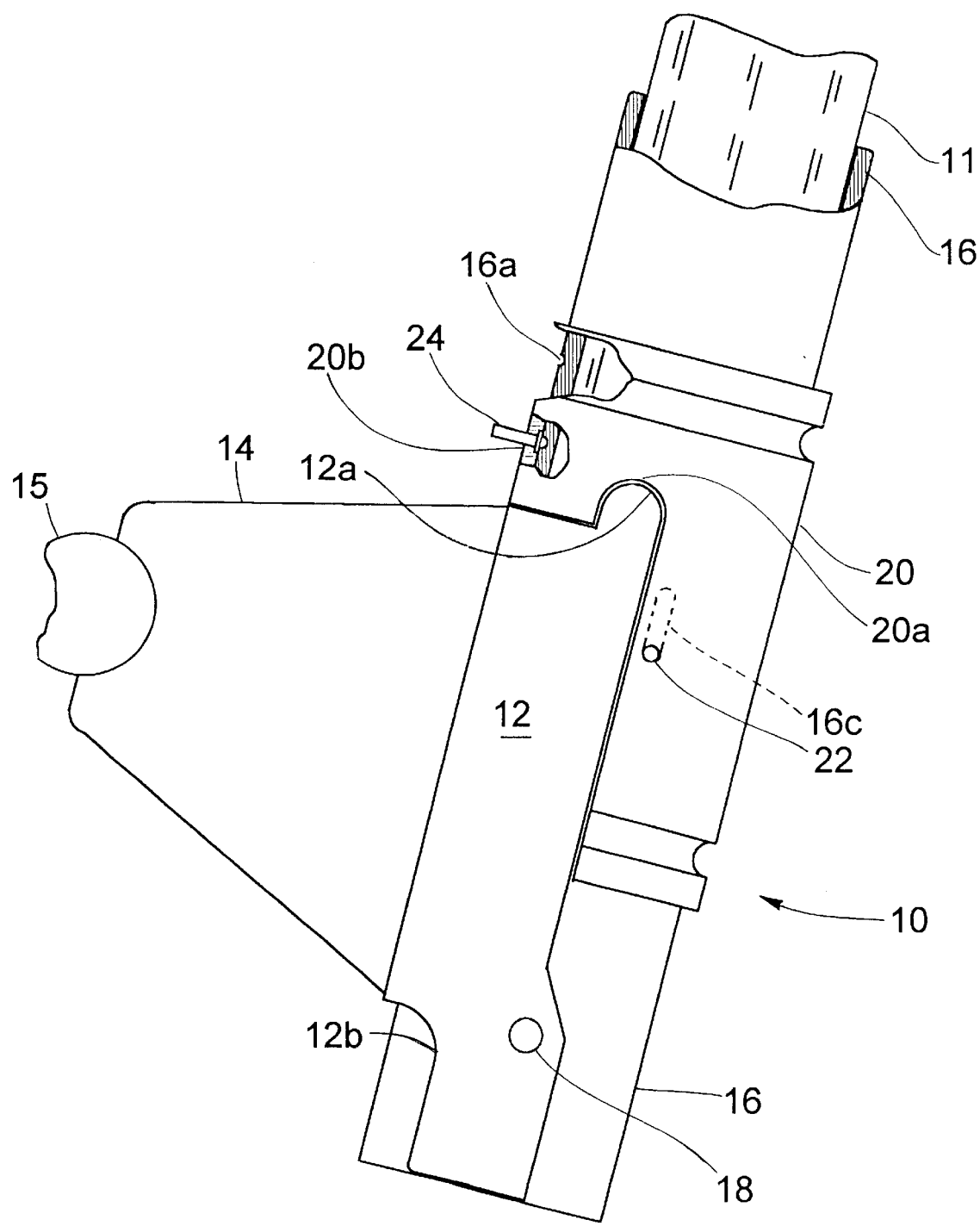
FIG. 2 is a side elevation view of one of the fishing rod holders mounted as in FIG. 1 with portions of the structure of the holder shown being broken away.
Figure 3:
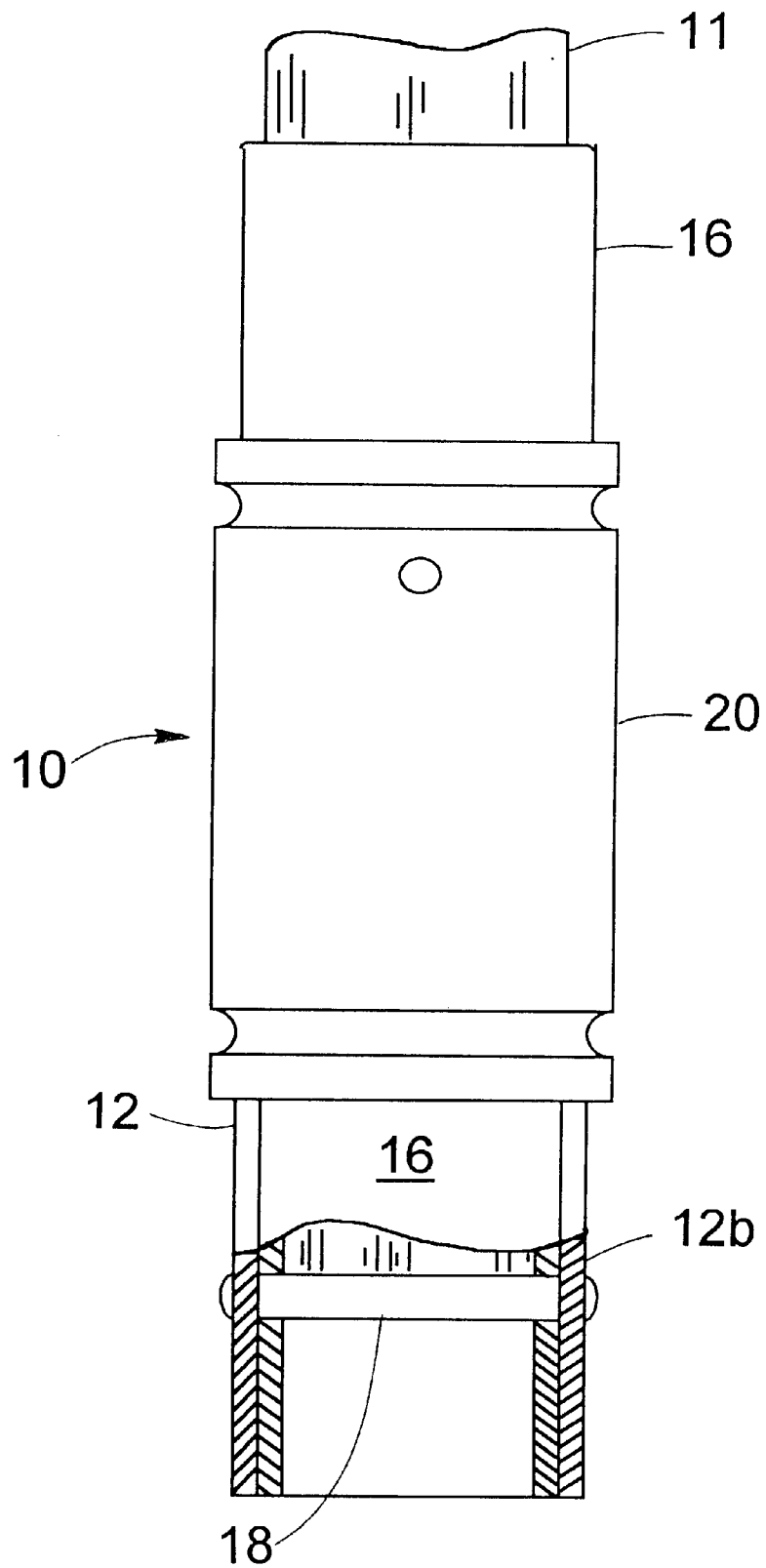
FIG. 3 is a frontal elevation view of the fishing rod holder of FIG. 2 with additional portions of the structure being broken away.

Referring now to FIGS. 2 and 3 in conjunction with FIG. 1, the present holder 10 is an assembly of three main elements, namely, a base member 12, a rod tube 16 and a latch handle 20, all constructed of tubular stock material, preferably metal and resistant to salt water corrosion, such as treated aluminum. The base member 12 is fabricated from the tubular material having a substantially semi-circular cross section along a major portion of its length, typically about six inches. The base member 12 is formed having a pair of finger-like tabs 12a extending forward from the main body of the base member approximately 180° apart and a pair of leg sections 12b extending rearward from the main body, each leg section having a circular opening diametrically therethrough and in alignment with each other. A weldment member 14, made of a plate material similar to that of base member 12, is attached along the top of the main body of the base member, preferably by welding, and set in a position radially extending therefrom. The outward edge of weldment member 14 is formed to engage supporting structure 15 along the rearward edge of hard top T and is secured thereto by welding or clamping using conventional means to thereby mount the holder 10 in place for use upon the boat B.

The rod tube 16 is cylindrically formed having an outer diameter slightly smaller than the inner diameter of the base member 12 so that the rod tube fits snugly within the base member when coaxially positioned. The inner diameter of the rod tube 16 is substantially uniform throughout its length and is established to be of sufficient size to contain and hold snugly the bottom of a standard size fishing rod 11 when placed coaxially within the chamber of the rod tube. The length of the rod tube 16 may vary and is typically in the range of nine to twelve inches in order to hold a variety of fishing rods and maintain their position within holder 10 despite random movements of the boat B. A pair of notches 16a and 16b are formed in the outer surface of the rod tube 16 at separate locations toward the upper or forward end of the tube wherein the fishing rod 11 is inserted. The upper notch 16a and lower notch 16b are spaced apart a predetermined distance along the surface of the rod tube 16 and made to be in axial alignment with the centerline of the rod tube. A slot 16c is further formed in and through the surface of the rod tube 16 on opposite sides of the tube about 160° apart near the middle of its length. Each slot 16c is formed in an axial direction along the rod tube 16 and located symmetrically relative to the upper and lower notches 16a and 16b. The length of each slot 16c is intended to be substantially equivalent to the spaced distance between the upper and lower notches 16a and 16b in the rod tube 16 and, as described in further detail below, establishes the motion of travel associated with the operation of the fishing rod holder 10 in accordance with the present invention. The rod tube 16 is further provided with a circular opening formed through the diameter of the rod tube toward the bottom or lower end of the tube. This circular opening is formed at approximately 90° relative to the location of the upper and lower notches 16a and 16b and is intended to align with the similarly sized circular openings made in the separate leg sections 12b of the base member 12. A pivot pin 18 sized to fit through the circular openings in both the leg sections 12a of base member 12 and the lower end of rod tube is diametrically disposed and fastened in place for rotatably coupling the base member and rod tube together in accordance with the operation of the present fishing rod holder 10. As seen more clearly in FIG. 3, the pivot pin 18 extends across the diameter of the base member 12 and through the chamber of rod tube 16 to serve as a pivotal connection therebetween and further provide containment of the bottom end of the fishing rod 11 held within the rod tube.

The latch handle 20 is a modified cylindrical piece having substantially the same inner diameter as base member 12 allowing the latch handle to slide coaxially over the outer diameter of the rod tube 16. The interior surface of the latch handle 20 is made smooth to promote sliding motion over the rod tube 16 while the outer surface may be knurled to facilitate its handling. The outer diameter of the latch handle 20 is also substantially the same as that of the base member 12 but further fabricated having an open section formed longitudinally along a portion of the latch handle and 180° radially about its surface, which open section is specifically configured to mate with and engage the forward end of the base member and the pair of tabs 12a extending therefrom. A notch 20a is formed in the latch handle 20 on the forward edge of the open section on either side thereof and configured in its depth and width to receive and contain the respective tabs 12a on either side of the base member 12 thus serving to hold the latch handle and base member together when placed in the upright position shown in FIG. 2. A guide pin 22 is set through a hole formed in the cylindrical surface of the latch handle 20 and made flush thereto, preferably located on both sides of the handle in alignment with the slot 16c of rod tube 16 so that the guide pin travels within the slot as the latch handle moves up and down along the rod tube. A conventional spring-loaded ball plunger 24 is further set radially through the upper cylindrical surface of the latch handle 20 in position to engage the upper and lower notches 16a and 16b along the rod tube 16, and with such engagement, the plunger helps to maintain the latch handle in proper operating position upon the rod tube.

Figure 4:
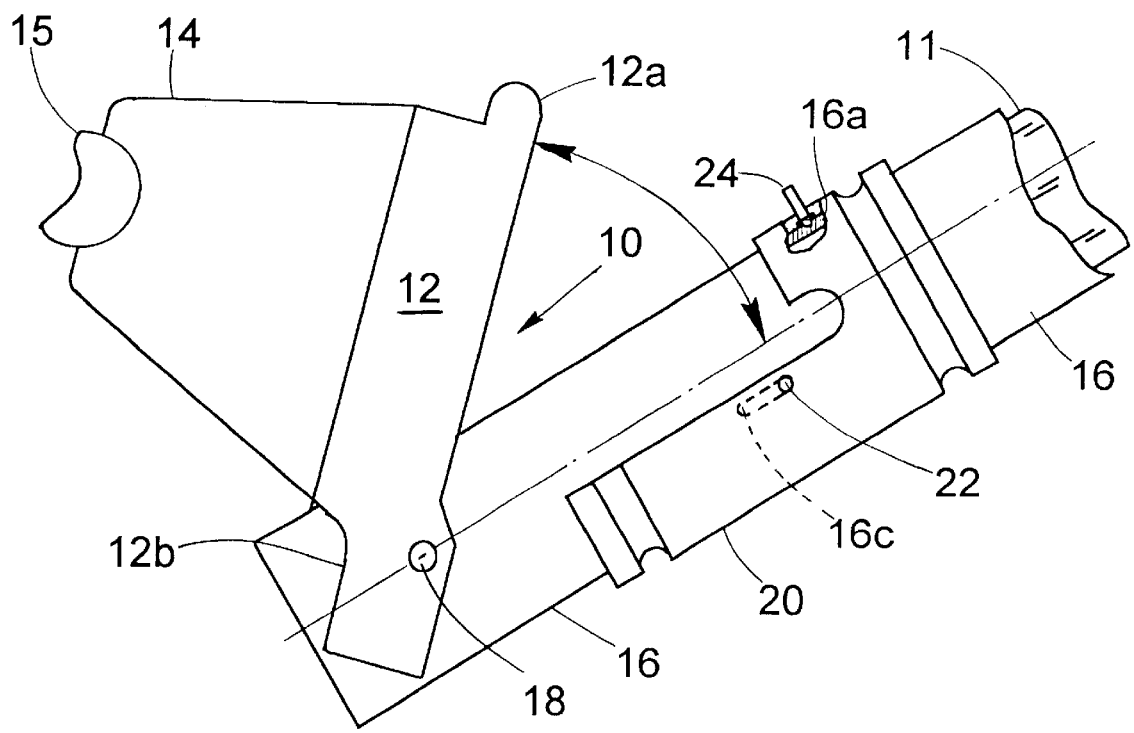
FIG. 4 is a side view of the fishing rod holder of FIGS. 2 and 3 shown in a lowered position relative thereto to illustrate its operation in accordance with the present invention.

Referring now to FIG. 4 in conjunction with FIGS. 2 and 3, the described fishing rod holder 10 is moved from the stationary upright position, wherein the base member 12 is coaxially positioned relative to the rod tube 16 and engaged with the latch handle 20 through the mating fit of the respective tabs 12a and notches 20a, by manually pushing the latch handle upward to slide along the rod tube 16 in conjunction with a release of the ball plunger 24. As the latch handle 20 is pushed upward, the guide pins 22 slide accordingly through the slot 16c in the rod tube 16 maintaining a straight path of travel for the latch handle and preventing the handle from spinning about the rod tube. The notches 20a on either side of the latch handle separate from the respective tabs 12a on base member 12, thus disengaging the handle from the base member and allowing the rod tube 16 to rotate downward from the base about pivot pin 18 to a position shown in FIG. 4, wherein the fishing rod 11 held within the rod tube may be easily removed or an alternate rod inserted. The rod tube 16 is intended to rotate downward without restriction to a position slightly above horizontal, as shown, typically being downward approximately 70° from its upright position. Such an angular position provides an ideal position for manual insertion and removal of the fishing rod 11 while preventing the rod from sliding out of the rod tube 16 on its own.

In the downward position of the holder 10 shown in FIG. 4, the guide 10 pins 22 in the latch handle 20 have moved forward through the respective slots 16c on either side of the rod tube 16 and the ball plunger 24 has engaged the upper notch 16a in the rod tube thus maintaining the relative position of the handle along the tube and facilitating a return of the handle and tube into upright engagement with the base member 12. To return the fishing rod holder 10 to its stationary upright position, the latch handle 20 is regrasped and rotated upward together with the rod tube 16, both pivoting relative to base member 12 about pivot pin 18, until the latch handle is coaxially aligned with the base member. At that point, the latch handle 20 is pulled downward to slide along the rod tube 16 in conjunction with the release of ball plunger 24 from upper notch 16a, causing the latch handle and base member 12 to re-engage about the respective notches 20a and tabs 12a.

Therefore, it is apparent that the described invention provides an improved fishing rod holder of the so-called rocket launcher style that is safer and easier to use and operate on a recreational fishing boat than those rod holders heretofore developed. The disclosed invention further provides an improved fishing rod holder for mounting upon overhead structure of a fishing boat that can be safely and effectively manipulated by a person on board the boat even while moving at sea. In addition, the present invention provides a rocket launcher style of fishing rod holder for use upon a fishing boat that can be deployed and operated by a person on board with one hand, if necessary, without leaving the deck of the boat. The present fishing rod holder is relatively inexpensive to manufacture and assemble and can be mounted easily upon the hard top or other overhead structure of a fishing boat.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials which may be developed at a fixture time to perform the same function as the present described embodiment are therefore considered to be part of the present invention. Accordingly, it is understood that this invention is not limited to the particular embodiment described, but rather is intended to cover modifications within the spirit and scope of the present invention as expressed in the appended claims.

What is claimed:

1. A fishing rod holder intended for use upon a boat, comprising: a base member having a substantially semi-cylindrical body adapted to be secured to the boat in a predetermined upright position, said base member having at least one tab member extending longitudinally from the body thereof; a tubular member cylindrically formed to fit concentrically within, the body of said base member and adapted to be pivotally coupled thereto; and a latch member cylindrically formed to fit concentrically over said tubular member and adapted to slide coaxially therealong, said latch member having at least one notch section to releasably engage the tab member on said base member in the predetermined upright position and thereby support said tubular member thereat.

2. A fishing rod holder according to claim 1, wherein: said tubular member is provided with at least one slot of a predetermined length formed in an axial direction along said tubular member; said latch member is provided with at least one hole formed in the surface thereof in axial alignment with the slot of said tubular member; and a pin member is secured within the hole of said latch member and projected into the slot of said tubular member to guide the sliding movement of said latch member over said tubular member in a predetermined axial direction.

3. A fishing rod holder according to claim 2, wherein: said tubular member is provided with a pair of notches spaced apart a predetermined distance along the surface of said tubular member in an axial direction; and detent means are radially secured through said latch member in position to selectively engage the respective notches in said tubular member and thereby maintain the position of said latch member relative to said tubular member.

4. A fishing rod holder according to claim 3, further comprising: mounting means for securing said base member to the boat in the predetermined upright position.

5. A device for holding a fishing rod, comprising: a base member formed having a substantially semi-cylindrical body including a pair of tab members forwardly extending from opposite sides of the body; a tubular member having a chamber sized to hold the fishing rod therein, said tubular member being cylindrically formed to fit coaxially within the body of said base member and rotatably connected thereto; and a latch member cylindrically formed to fit coaxially over said tubular member and slide longitudinally therealong, said latch member being further provided with a pair of notch sections formed to matingly fit the pair of tab members providing for releasable engagement between said latch member and said base member.

6. A device according to claim 5, wherein: said tubular member is further formed having an axial slot provided along the length thereof; and pin means are further provided attached to said latch member and radially engaging the slot to guide the movement of said latch member over said tubular member in a predetermined axial direction.

7. A device according to claim 6, wherein: said tubular member is further formed having a pair of notches spaced apart a predetermined distance in an axial direction; and ball-plunger means are secured to said latch member and radially directed therethrough to selectively engage the respective notches in said tubular member.

8. A device according to claim 7, further comprising: mounting means attached to said base member for stationing the body of said base member in a predetermined upright position.

9. A device for holding a rod relative to a structure, comprising: a tubular member adapted to be mounted to the structure, said base member having a longitudinal body formed to fit immediately about said tubular member and adapted to be rotatably connected thereto, the longitudinal body having at least one tab member extending forwardly therefrom; and a latch member formed to fit immediately over said tubular member and adapted to slide longitudinally therealong in a bidirectional path, said latch member having at least one notch section formed therein providing a mating configuration with the tab member in order to engage said base member in one direction thereby supporting said tubular member in a stationary upright position and to disengage from said base member in the opposite direction thereby permitting said tubular member to rotate from the stationary position.

10. A device according to claim 9, further comprising: mounting means attached to said base member for placing the longitudinal body of said base member in the stationary upright position.

11. A device according to claim 9, wherein: said tubular member is provided with a slot formed along a predetermined length thereof; and a pin member is firther provided connected to said latch member and extended into the slot to guide the sliding movement of said latch member over said tubular member.

12. A device according to claim 11, further comprising: detent means connected to said latch member for selectively engaging said tubular member at separate points along the length thereof thereby maintaining the position of said latch member relative to said tubular member.

* * * * *